United States Patent
Ramsey et al.

(10) Patent No.: US 7,861,222 B2
(45) Date of Patent: *Dec. 28, 2010

(54) DISCOSCRIPT: A SIMPLIFIED DISTRIBUTED COMPUTING SCRIPTING LANGUAGE

(75) Inventors: William D Ramsey, Redmond, WA (US); Ronnie I Chaiken, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/762,333

(22) Filed: Jun. 13, 2007

(65) Prior Publication Data

US 2008/0313610 A1    Dec. 18, 2008

(51) Int. Cl.
*G06F 9/44* (2006.01)
(52) U.S. Cl. ........................ 717/115; 717/114
(58) Field of Classification Search ........................ None
See application file for complete search history.

(56) References Cited

U.S. PATENT DOCUMENTS

| | | | |
|---|---|---|---|
| 5,404,528 | A | 4/1995 | Mahajan |
| 5,963,934 | A | 10/1999 | Cochrane et al. |
| 5,978,594 | A | 11/1999 | Bonnell et al. |
| 5,999,729 | A | 12/1999 | Tabloski, Jr. et al. |
| 6,195,097 | B1 | 2/2001 | Shrader et al. |
| 6,243,711 | B1 | 6/2001 | Wu et al. |
| 6,886,024 | B1 | 4/2005 | Fujita et al. |
| 7,047,232 | B1 * | 5/2006 | Serrano ........................ 717/115 |
| 7,047,530 | B2 * | 5/2006 | Lu ........................ 717/101 |
| 7,117,503 | B2 | 10/2006 | Camara et al. |
| 2002/0129345 | A1 | 9/2002 | Tilden et al. |
| 2004/0148605 | A1 | 7/2004 | Kim |
| 2004/0237069 | A1 | 11/2004 | Colgrave |
| 2006/0234548 | A1 | 10/2006 | Qing et al. |
| 2006/0277323 | A1 | 12/2006 | Joublin et al. |

FOREIGN PATENT DOCUMENTS

| | | |
|---|---|---|
| EP | 1026587 A2 | 8/2000 |
| EP | 1729213 A1 | 12/2006 |

OTHER PUBLICATIONS

Chaiken et al. SCOPE: Easy and Efficient Parallel Processing of Massive Data Sets, 2008, ACM.*
Pike, et al., "Interpreting the Data: Parallel Analysis with Sawzall", Google Inc., vol. 13, Issue 4, Oct. 2005, pp. 1-33.
Samani, et al., "GEM: a generalized event monitoring language for distributed systems", The British Computer Society, 1997, pp. 96-108.
"Vaakya Distributed Computing Architecture", available at least as early as Mar. 7, 2007, at <<http://www.vaakya.com/technology.html>>, pp. 1-3.

* cited by examiner

*Primary Examiner*—Wei Y Zhen
*Assistant Examiner*—Junchun Wu

(57) ABSTRACT

Scripting core commands and aggregations of such commands are provided to script authors to enable them to generate scripts that can be parallel-processed without requiring the author to be aware of parallel-processing techniques. The scripting core commands and aggregations abstract mechanisms that can be executed in parallel, enabling the script author to focus on higher-level concepts. The scripting core commands provided include commands for applying a function in parallel and distributing and joining data in parallel. For added flexibility, one or more scripting core commands can utilize functions written in a different programming language and referenced appropriately in code blocks.

20 Claims, 10 Drawing Sheets

900

910

```
<c# block="ComputeNGrams" command="Process">
    Static void ComputeNGrams(StreamReader reader, StreamWriter
                                                 writer, string[] args)
    {
        int num = args.Length > 0 ? System.Convert.ToInt32(args[0]) : 2;

string line;
        while ((line = reader.ReadLine()) != null)
        {
            string[] tokens = line.ToLower().Split(' ');
            for (int i = 0; i < tokens.Length - num + 1; ++i)
            {
                string ngram = tokens[i];
                for (int j = 1; j < num; ++j)
                {
                    ngram += " " + tokens[i + j];
                }
                writer.WriteLine(ngram);
            }
        }
    }
</c#>
```

920

```
<c# block="Count" command="Process>
    static public void Count(StreamReader reader, StreamWriter writer,
                                                  string[] args)
    {
        string line = reader.ReadLine();
        string previous = line;
        int count = 1;
        while ((line = reader.ReadLine()) != null)
        {
            //refine logic here
            if (line != previous)
            {
                writer.WriteLine(previous + "\t" + count);
                previous = line;
                count = 1;
            }
            else
            {
                ++count;
            }
        }
            if (previous != null)
        {
            writer.WriteLine(previous + "\t" + count);
            }
    }
</c#>
```

Figure 10

DISCOSCRIPT: A SIMPLIFIED DISTRIBUTED COMPUTING SCRIPTING LANGUAGE

BACKGROUND

Because of the increasingly interconnected nature of computing devices throughout the world, the data gathered and generated by those computing devices has grown at an exponential rate. The time to process such increasing amounts of data, using traditional methodologies, will, therefore, exponentially increase as well. For businesses, educational and governmental institutions, and others who provide or consume services derived from billions of individual data points, the management of such a large amount of data in an efficient manner becomes crucial. Thus, as the amount of data being gathered and generated increases, the infrastructure for storing, managing, and operating on such data needs to expand as well.

Traditionally, large quantities of data were efficiently handled using fault-tolerant storage systems and parallel-processing algorithms. Fault-tolerant storage systems enabled large quantities of data to be stored across hundreds or even thousands of inexpensive storage media, despite the risks that at least one of these storage media would fail, rendering the data stored on it inaccessible. Parallel-processing, or algorithms enabled large quantities of data to be efficiently gathered and processed by simply dividing the necessary labor across inexpensive processing equipment, such as the multi-core microprocessors present in modern computing hardware.

However, while fault-tolerant storage systems can be implemented in a generic fashion, such that a single fault-tolerant storage algorithm can be used to store any type of information, parallel-processing algorithms are, by their nature, specific to the particular problem that they seek to solve or the particular task that they seek to accomplish. Thus, a search engine can use the same fault-tolerant storage mechanisms as a weather prediction engine, but, obviously, they would each rely on vastly different parallel-processing algorithms.

SUMMARY

Generating the necessary computing instructions to perform parallel-processing can be a daunting task, even for experienced programmers. In many cases, however, the programmers most in need of the execution efficiencies to be gained from parallel-processing are those who are looking to perform a simple set of commands, albeit generally on a very large set of data. In one embodiment, therefore, simple mechanisms are provided for generating algorithms that can benefit from parallel-processing, including the provision of several scripting core commands optimized for parallel-processing that can be access via simplified programming techniques, such as script-based programming languages. Such scripting core commands can be based on operations that are commonly used in parallel, or distributed, computations, such as the partitioning of data into collections, or "buckets," the aggregating of parallel outputs, the processing of data in parallel, and the joining of two parallel outputs.

One scripting core command can accept, as input, a function that the script author wishes to have executed across multiple processes, or processors, in parallel. The underlying mechanisms supporting such a command can initially interpret that scripting command, together with the supporting script, and generate executable instructions that provide for the distribution of the input function in a known manner, thereby enabling the script author to take advantage of parallel processing efficiencies without writing anything more complicated than a simple script. Another scripting core command can process data, specified by the script author, in parallel, such that each process divides its portion of the data into a specified number of sub-divisions. A further scripting core command can aggregate multiple data segments from multiple, independent, parallel processes into one or more collections. The combination of the scripting core command dividing data followed by the scripting core command aggregating data results in a mapping operation that is often used in parallel-processing.

In addition to aggregating the data from multiple processes, further scripting core commands can be provided for merging data from multiple processes including, joining data from multiple processes and performing a cross-product on data from multiple processes. The scripting core command for joining data can result in the merging of data that is output by two prior operations, each of which had the same number of outputs, such that the first output of the former operation is joined with the first output of the latter operation, the second output of the former operation is joined with the second output of the latter operation, and continuing in such a manner for the remaining outputs of the former and latter operations. The join scripting core command, therefore, can result in the same number of outputs as the two prior operations whose outputs are being joined. Alternatively, the scripting core command for performing a cross-product can result in the merging of data that is output by two prior operations such that the first output of the former operation is joined, successively, with each of the outputs of the latter operation, the second output of the former operation is joined, successively, with each of the outputs of the latter operation, and continuing in such a manner for the remaining outputs of the former operation. Thus, the number of outputs of the cross-product scripting core command can be equal to the product of the number of outputs of the former command and the number of outputs of the latter command.

In a further embodiment, given the above described scripting core commands, abstractions can be provided to enable a script author to easily perform common tasks. For example, a commonly performed sorting operation can be provided as an abstraction of the above described scripting core command that applies a specified function to collections of data independently across multiple processes. In the case of the sorting abstraction, the specified function can be a storing function. Alternatively, an abstraction can be a combination of two or more scripting core commands, together performing a common operation. For example, as indicated, the combination of the scripting core command dividing data followed by the scripting core command aggregating data can result in the often-used mapping operation. Thus, a mapping abstraction can provide, for a script author, a single mechanism to use, abstracting the details of calling each scripting core command individually.

In a still further embodiment, mechanisms can be provided by which the scripting core commands can reference and use blocks of instructions written in another computer programming language, such as Visual Basic®, C#, or even in less traditional, more structured languages, such as the Structured Query Language (SQL). The code blocks can be wrapped, during interpretation of the supporting script, with appropriate elements, such as a main entry function, to enable their compilation. Subsequently, they can be executed, in parallel, together with the compiled version of any supporting script using one or more of the scripting core commands. For structured languages, such as SQL, instead of being wrapped, the code blocks can be interpreted and can generate executable instructions in a similar manner as the generation of executable instructions based on the supporting script using one or more of the scripting core commands.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which:

FIG. 10 is a code diagram illustrating code blocks referenced in FIG. 9.

DETAILED DESCRIPTION

The following description relates to the provision of scripting core commands that enable a script author to generate a script whose performance can profit from parallel-processing techniques. Each scripting core command enables a script author to invoke operations across one or more processes independently, and in parallel. The script author, therefore, need only write a script comprising one or more of the scripting core commands and their script will be capable of being parallel-processed. Additional abstractions, based upon the scripting core commands, can be provided to enable a script author to efficiently script common tasks. Some abstractions can be a single scripting core command utilized in a particular manner, or with a particular input, while other abstractions can comprise two or more scripting core commands utilized in a particular order.

The techniques described herein focus on, but are not limited to, the provision of scripting core commands providing access to parallel-processing mechanisms in the context of a computer-implementable script. None of the embodiments described below, however, require a specific aspect of any particular scripting language, such as Visual Basic® Script or JavaScript. Consequently, the specific examples provided below are written in a generic scripting language and it will be clear to those skilled in the art how such descriptions can be implemented in a particular scripting language of the reader's choosing.

Figure 1:
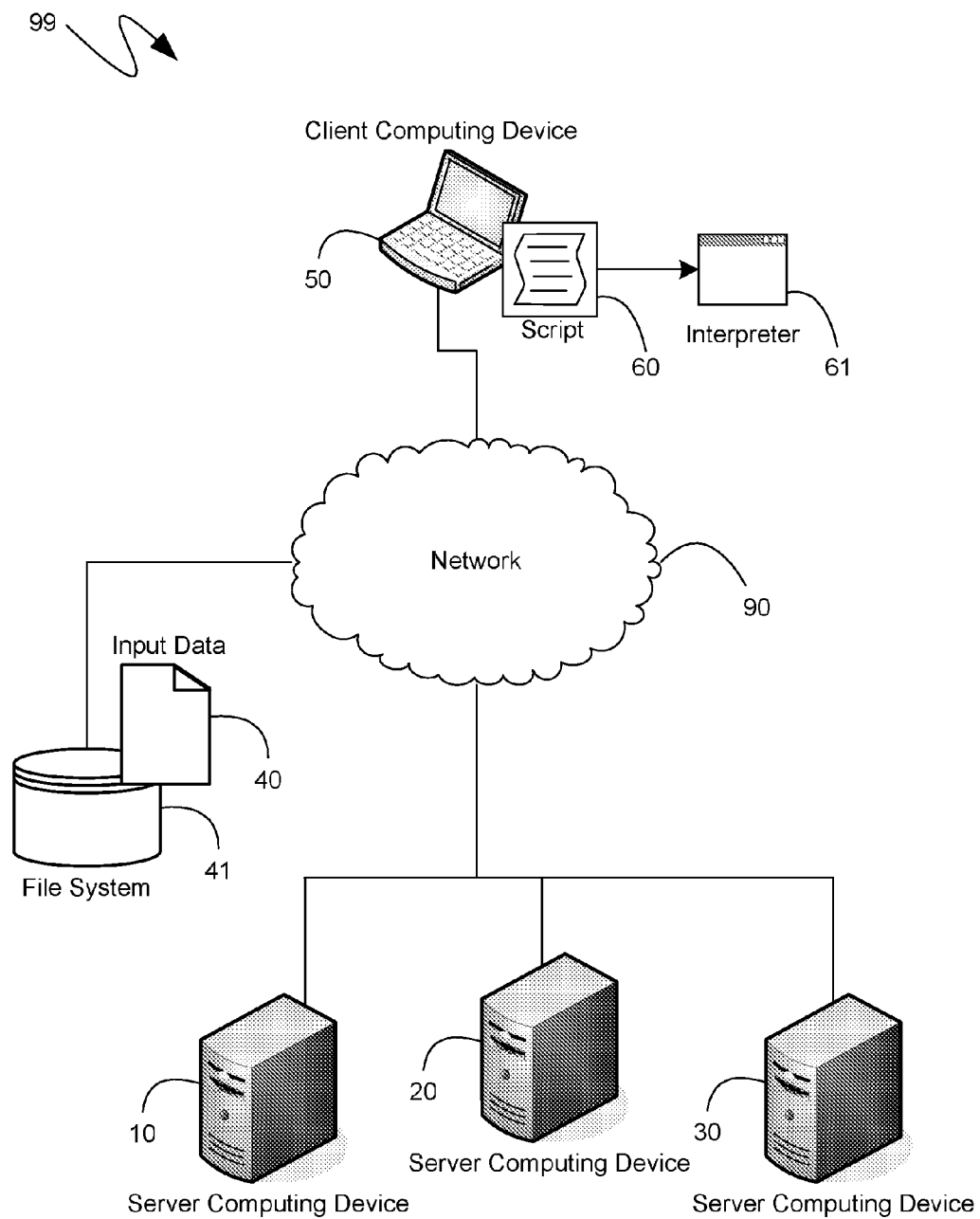
FIG. 1 is a block diagram of an exemplary network comprising multiple interconnected devices, some of which can perform operations in parallel.

Turning to FIG. 1, an exemplary network system 99 is illustrated comprising the network 90 itself, a client computing device 50, a file system 41, and multiple server computing devices, such as server computing devices 10, 20 and 30, all connected to the network 90. The file system 41 can be local to the client computing device 50, one of the server computing devices 10, 20 or 30, or some other computing device, or it can be distributed among multiple computing devices such as computing devices 10, 20, 30 or 50. The file system 41 can comprise one or more files that can act as input data 40 to a script 60, illustrated as being interpreted by the interpreter 61 on the client computing device 50. The interpreter 61 can convert the script 60 into computer-executable instructions that are more easily executed and, as described in detail below, can be executed in parallel by the server computing devices 10, 20 and 30

In one embodiment, the input data 40 can comprise a very large amount of data such that the processing of such data can be prohibitively slow if performed by only a single computing device or a single process within a computing device capable of hosting multiple simultaneous processes. For example, if the input data 40 comprised several hundred terabytes of data, the processing of such data using a single computing device could take days or even weeks to complete. To process data of such size within a reasonable period of time, multiple computing devices, each of which can host one or more independent processes, can independently, and in parallel, process some segment of the input data 40, thereby decreasing the processing time by a factor proportional to the number of independent processes operating in parallel.

Modern server computing devices often comprise multiple processors capable of executing multiple simultaneous processes. Furthermore, virtual machine technologies often enable such server computing devices to execute more processes in parallel than the physical number of processors installed. However, for simplicity of illustration and description only, and not because of any inherent limitation in the mechanisms described, the descriptions below will proceed as if the server computing devices 10, 20 and 30 comprise a single processor capable of simultaneously executing a single process.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
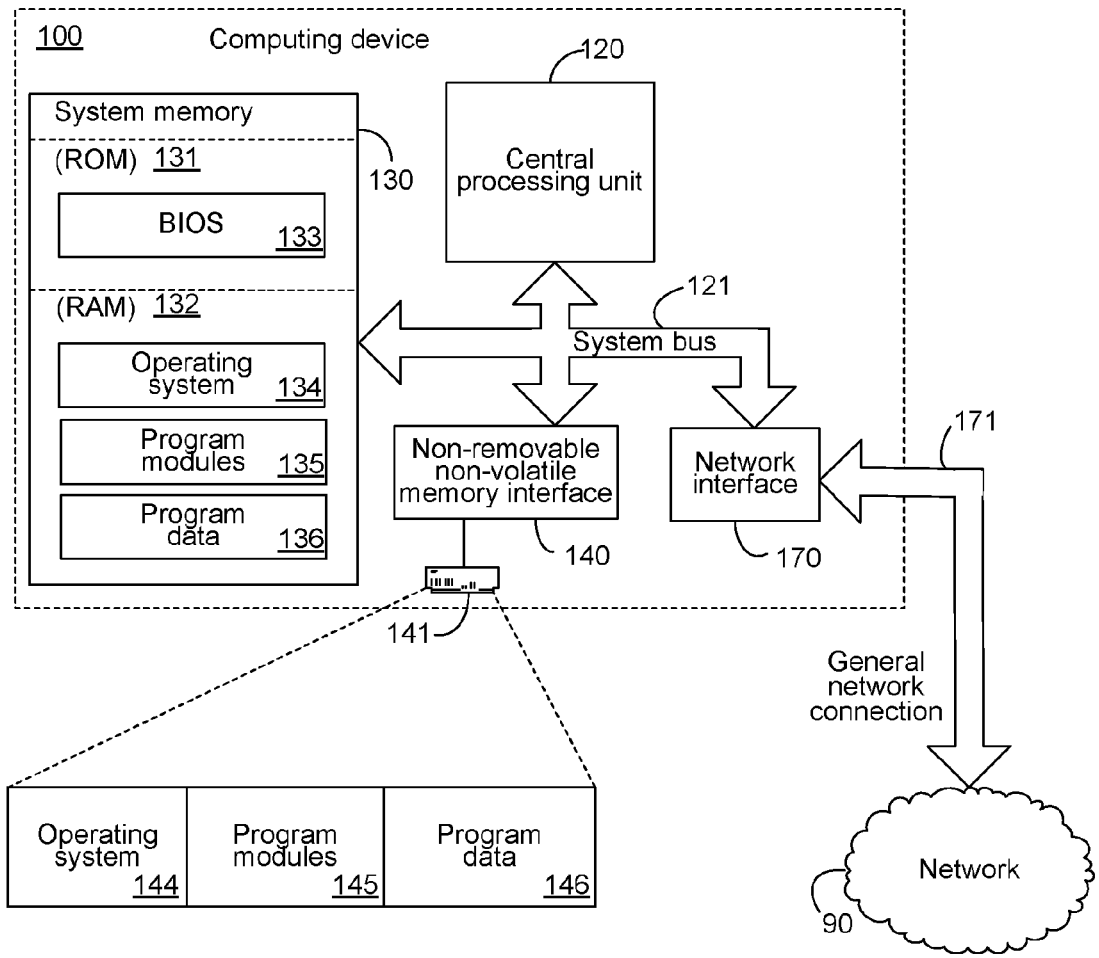
FIG. 2 is a block diagram of an exemplary computing device.

With reference to FIG. 2, an exemplary computing device 100 is illustrated. The computing device 100 can represent any of the computing devices 10, 20, 30 or 50 of FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Irrespective of the specific network connections and communicational protocols used, however, so long as the computing device 50 can communicate with the server computing devices 10, 20 and 30 in an appropriate manner, the computing device can use the server computing devices to perform, in parallel, the instructions enumerated by the script 60, which can be directed to the input data 40. To enable easier creation of the script 60, scripting core commands can be provided which enable a script author to utilize the parallel processing capabilities provided by, for example, the server computing devices 10, 20 and 30, without requiring the script author to possess the skills typically required to generate parallel-processing code. The scripting core commands can be utilized in the same manner as any other scripting command, with the exception that the scripting core commands described, instead of generating instructions for execution on a single processor, can generate the appropriate instructions necessary for proper execution on multiple, parallel processors.

One such scripting core command can enable a script author to apply a function to data in parallel, thereby potentially dramatically decreasing the time required to perform the function, as compared to a serial execution of the function. For example, if the script author wanted identify to each web page that used a particular word, from among a collection of several billion web pages, the searching function written by the script author could be executed by several thousand individual processors operating in parallel, using the function to search only a few thousand web pages. The web pages would then be searched several thousand times faster than if a single processor executed the same function to search all several billion web pages by itself.

Figure 3:
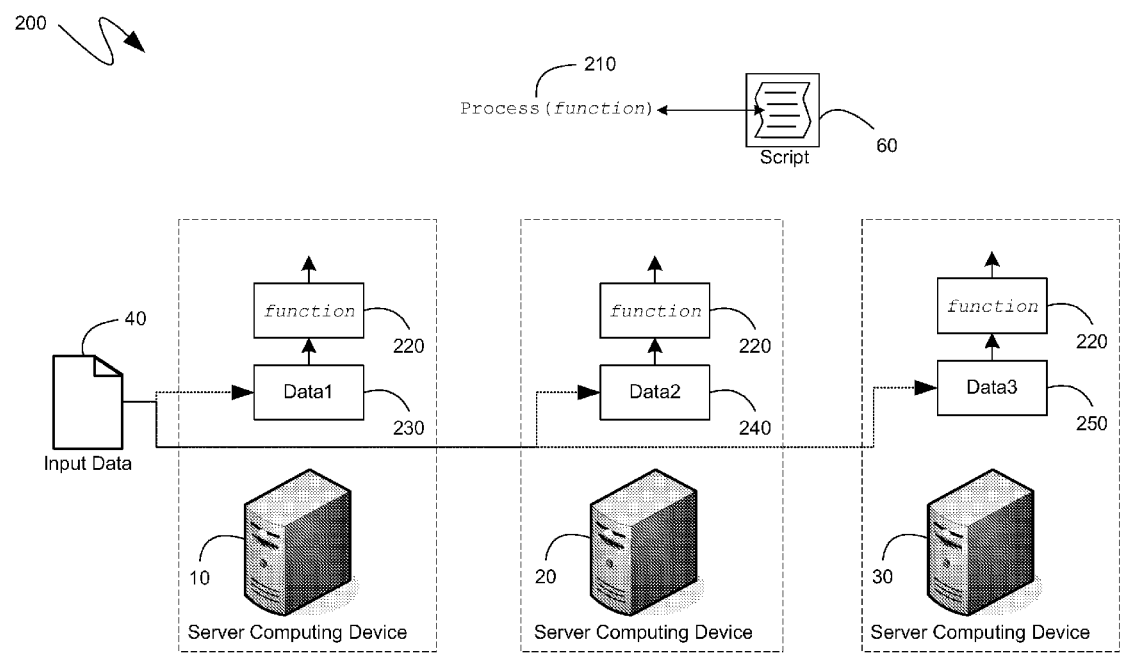
FIG. 3 is a block diagram of a "process" scripting core command.

Turning to FIG. 3, such a scripting core command, referred to hereinafter as the "process" command is illustrated with respect to the functional diagram 200. The use of the process scripting command 210 within the script 60 can enable the performance of the operations illustrated with respect to the server computing devices 10, 20 and 30. Specifically, a script author can specify a function to be provided as input to the process scripting command 210. The process scripting command 210 can then apply that function in parallel across multiple processes. For example, as shown in FIG. 3, if the function specified by the script author performed some action with respect to the input data 40, the data could be partitioned into data segments 230, 240 and 250 across server computing devices 10, 20 and 30 and each data segment could then be acted upon by the specified function 220 in parallel as shown.

In one embodiment, the function 220 can be a pre-existing executable program. In such a case, the syntax of process scripting command 210 can be as simple as "process(<<executable>>)" where "<<executable>>" can represent the name of the executable file. Thus, if the function 220 was encapsulated in an executable file named "function.exe" the syntax of the process scripting command 210 can be as simple as "process(function.exe)". Alternatively, the syntax of the process scripting command 210 can comprise, in addition to the specification of the executable program, a specification of the data upon which the function 220 is to be applied, such as the data shown in FIG. 3 as divided into data segments 230, 240 and 250. If the function 220 is applied to data resident in a file, the specification of such data as part of the process scripting command 210 can be in the form of a file name. Alternatively, if the function 220 is applied to the output of one or more prior functions, such output can be specified by a variable name or whatever other mechanism is provided by the scripting language being used.

In an alternative embodiment, the function 220, rather than being an already created executable program, can instead comprise customized computer-executable instructions written in a programming language and conforming to a particular format so as to more effectively be used with the process scripting command 210. Such a function will be referred to hereinafter as a "process code block" and can be written in any higher level computer programming language, thereby enabling the script 60 to reference functions written in potentially more powerful computer languages. To reference the process code block, the syntax of process scripting command 210 can be as simple as "process(<<code block>>, <<arguments>>)" where "<<code block>>" can represent the name of the function defined by the process code block, in the manner described below, and "<<arguments>>" can represent any arguments that the process code block may be able to receive and that the script author may wish to specify.

In one embodiment, the process code block can be designated by tags identifying the higher level computer programming language used. The tags can further comprise parameters directed to the name of the function and an identification of the type of scripting core command which will be referencing the code block. For example, a process code block written in the C# computer programming language can be of the form shown in Table 1, below, where the tag, defined by the angle brackets, specifies the language "c#". The tag can further comprise a "block" parameter having assigned to it the name of the function being defined by the code block, and a "command" parameter having assigned to it an identification of the scripting core command, in this case the process scripting core command, by which the code block will be referenced. In addition, to conform with the concept of the process scripting command 210, the function being defined in Table 1 can have a single input and a single output. Specifically, the reading of data can be performed by a reader belonging to the well-known C# class StreamReader and the writing of data can be performed by a writer belonging to the well-known C# class StreamWriter.

TABLE 1

```
<c# block="SampleProcess" command="Process">
    static void SampleProcess(
        StreamReader reader,
        StreamWriter writer,
        string[ ] args);
    {
    }
</c#>
```

As indicated previously, descriptions and examples provided using one programming language are not meant to limit the disclosure in any manner. Thus, while the code block example provided above was written in C#, a code block, as indicated previously, can be implemented in any higher level programming language. For example, a code block implemented in Perl can be in the form shown in Table 2, below. Specifically, as can be seen, the tag indicating the code block specifies the Perl language and, includes the block and command parameters described above.

TABLE 2

```
<perl block="SamplePerlProcess" command="Process">
    #!/usr/bin/perl
    while (<STDIN>)
    {
    }
</perl>
```

When the script 60 is interpreted by the interpreter 61, the code blocks can be identified and, based on the tags, an appropriate interpretation or compilation mechanism can be invoked. For example, for code blocks written in the C# programming language, and other analogous languages, a main entry function can be created, logic to create and exchange the arguments provided for in the code block can be generated, and the code of the code block can otherwise be wrapped into an object for execution. Similarly, for code blocks written in scripting languages, they can be interpreted and otherwise prepared for execution. Subsequently, the code can be referenced in an appropriate manner so that it may be executed in parallel as specified by the scripting core command that invoked it. In one embodiment, the programming or scripting in a code block is not checked prior to runtime and is, instead, compiled or interpreted as written.

Because the process scripting core command 210 provides script authors with the ability to process, in parallel, a wide variety of functions that can be programmed by the script authors themselves to suit their particular needs, the process scripting command can be very versatile. However, there exist several often-used functions, especially within the field of data processing, that can be provided to a script author to avoid forcing each script author to independently write their own versions when such customization is not necessary. Thus, additional core functions are contemplated that provide script authors simplified access to more commonly used data processing functions.

One such scripting core command can enable the division, in parallel, of multiple segments of data into subdivisions according to one or more criteria that can be specified by a programmer. Such a scripting core command, hereinafter referred to as the "distribute" command, is illustrated by the functional diagram 300 of FIG. 4. As shown, the use of the distribute scripting command 310 in the script 60, together with a specification of a value, represented by the variable "N" in FIG. 4, enables a script author to divide sections of data, in parallel, into as many subdivisions as specified by the value "N." For example, input data 40 can be distributed among multiple different processes operating in parallel, such as represented by the individual server computing devices 10, 20 and 30. Each distribution of data 230, 240 and 250 can then be divided into subdivisions 320, 330 and 340 by the server computing devices 10, 20 and 30, respectively, in parallel.

Figure 4:
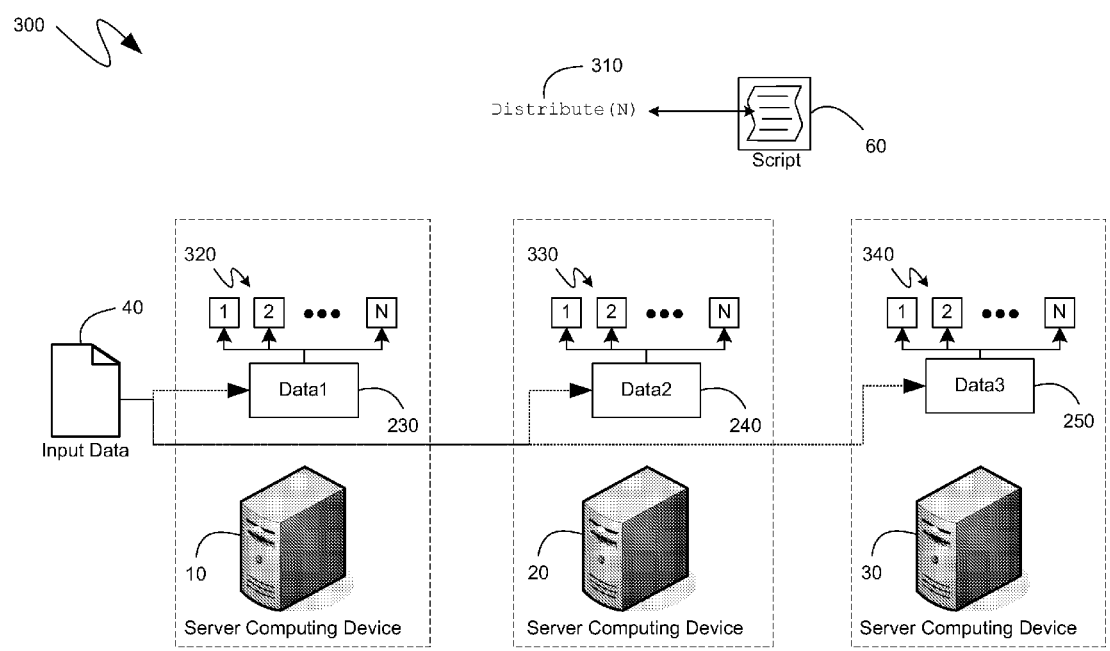
FIG. 4 is a block diagram of a "distribute" scripting core command.

The distribute scripting command 310 shown in FIG. 4, for simplicity of illustration, indicates only a single parameter, namely the specification of the number of subdivisions. However, to provide further flexibility, the distribute scripting command can be of a number of different forms, including forms that enable a script author to specify an executable program or code block, hereinafter referred to as a "distribute code block," to perform each of the divisions, and forms that enable a script author to specify the data to be divided.

In one embodiment, the form of the distribute scripting command 310 can be as simple as "distribute(<<executable>>, N) where "<<executable>>" can represent the name of the executable file and the variable "N" can represent a numerical value signifying the number of subdivisions in which the data is to be divided by each process. In an alternative embodiment, the distribute scripting command 310 can specify a distribute code block instead, and can be of the form "distribute(<<code block>>, <<arguments>>, N) where "<<code block>>" can represent the name of the function defined by the distribute code block, in the manner described below, "<<arguments>>" can represent any arguments that the distribute code block may be able to receive and that the script author may wish to specify, and "N" can represent a numerical value signifying the number of subdivisions into which the data is to be divided by each process.

As with the process code block described above, a distribute code block can be a customized function that can be written by a programmer in any higher level computer programming language and that can be executed in parallel as part of the distribute scripting core command described above. More specifically, the distribute code block can enable a programmer to describe, with specificity, exactly how the data is to be divided by each process. In one embodiment, the distribute code block can provide for the specification of a mechanism to read the data to be divided, the specification of one or more mechanisms to write the data into the subdivisions, and the specification of one or more arguments that can be passed to it. An example of a distribute code block written in the C# programming language is illustrated in Table 3, below. As before, the code block can be identified with tags that specify the language used. In the example in Table 3, the tag is shown specifying the C# programming language. In addition, as also described above, the tag can comprise parameters identifying the name of the function being defined and the scripting core command with which the function will be used. For example, the "block" parameter of Table 3 can comprise the name of the function in the distribute code block, while the "command" parameter can indicate that the function will be used with the distribute scripting core command. In the particular C# example provided in table 3, the function itself can comprise the specification of a mechanism for reading the data to be divided, which can belong to the StreamReader class, and the specification of the mechanisms for writing the data into the subdivisions, which can each be instances of the StreamWriter class.

TABLE 3

```
<c# block="SampleDistribute" command="Distribute">
    static void SampleDistribute(
        StreamReader reader,
        List<Streamwriter> writers,
        string[ ] args);
    {
    }
</c#>
```

In one embodiment, the data to be distributed by the distribute scripting command 310 can be default data specified by the interpreter 61 at the time that the script 60 is interpreted. For example, if the distribute scripting command 310 does not specify an input data, the interpreter 61 can specify the output of the prior scripting core command used in the script 60 as the input to the distribute scripting command. In an alternative embodiment, in addition to specifying an executable program, or a code block and arguments, together with an indication of the number of sub-divisions in to which data is to be distributed, the syntax of the distribute scripting command 310 can further include a specification of the data to be distributed. Such a specification can be in the form of a name and location of a file comprising the data, a variable pointing to the data, or any other analogous mechanism provided by the scripting language being used.

Figure 5:
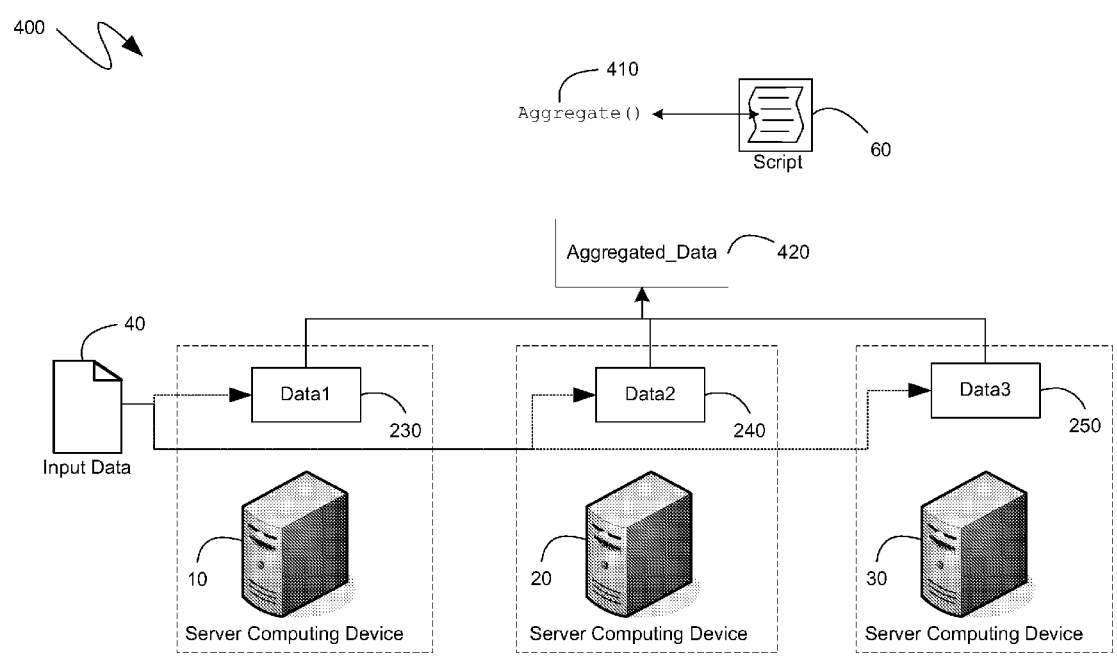
FIG. 5 is a block diagram of an "aggregate" scripting core command.

In addition to dividing data into subsections, another operation common in the data processing field is the aggregation of two or more independent collections of data into a single data collection. Thus, another scripting core command that can provide script authors with simplified access to commonly used commands is the "aggregate" scripting core command, whose operation, in one embodiment, is illustrated by the functional diagram 400 of FIG. 5. As shown, the aggregate scripting command 410, when used in script 60, can cause the server computing devices 10, 20 and 30, each having access to data segments 230, 240 and 250, respectively, to combine each of those data segments into a single data collection 420.

In one embodiment, the aggregate scripting command 410 can combine data segments from multiple processes, such as data segments 230, 240 and 250, in a default manner. As with the process and distribute scripting commands, the aggregate scripting command 410 can support a syntax that enables the script author to specify an executable program or code block to perform the aggregation. Thus, the aggregate scripting command 410 can be of a form "aggregate(<<executable>>) where "<<executable>>" can represent the name of the executable file, or, alternatively, it can be of the form "aggregate(<<code block>>, <<arguments>>)" where "<<code block>>" can represent the name of the function defined by the aggregate code block, in the manner described below and "<<arguments>>" can represent any arguments that the aggregate code block may be able to receive and that the script author may wish to specify. Similarly, the aggregate scripting command 410 can, like the process and distribute scripting commands described above, also include a specification of the data to be aggregated. Traditionally, the aggregate scripting command 410 would be used to aggregate the data segments output by some previously performed function. Consequently, in one embodiment, the specification of the data segments to be aggregated can be in the form of a variable pointing to the data segments, or any other analogous mechanism provided by the scripting language being used. In an alternative embodiment, the interpreter 61 can automatically provide the input data segments when the script 60 comprising the aggregate scripting command 410 is interpreted.

If the aggregate scripting command 410 specifies an aggregate code block, the aggregate code block can, in a manner analogous to the distribute code block described above, provide for the specification of multiple inputs, a single output, and any arguments that may be appropriate. Table 4, below, provides an example of an aggregate code block written in the C# programming language. As with the previously described code blocks, the tags identifying the aggregate code block can indicate the higher level programming language used in the code block, C# in the illustrated example, and can comprise parameters specifying the name of the function and the scripting core command with which it is to be used. In the illustrated example of Table 4, the aggregate code block comprises a function having multiple input, each of which is an instance of the StreamReader class and one output is shown as an instance of the StreamWriter class.

TABLE 4

```
<c# block="SampleAggregate" command="Aggregate"
    static void SampleAggregate(
        List<StreamReader> readers,
        StreamWriter writer,
        string[ ] args);
    {
    }
}
</c#>
```

In an alternative embodiment, the aggregate scripting command 410 can perform a slightly different default function when it is used in combination with the previously described distribute scripting command 310. Such a different function can be performed merely by virtue of the placement of an aggregate scripting command immediately after a distribute scripting command within the script 60, and need not require any change from the above described syntax of the aggregate scripting command 410.

Figure 6:
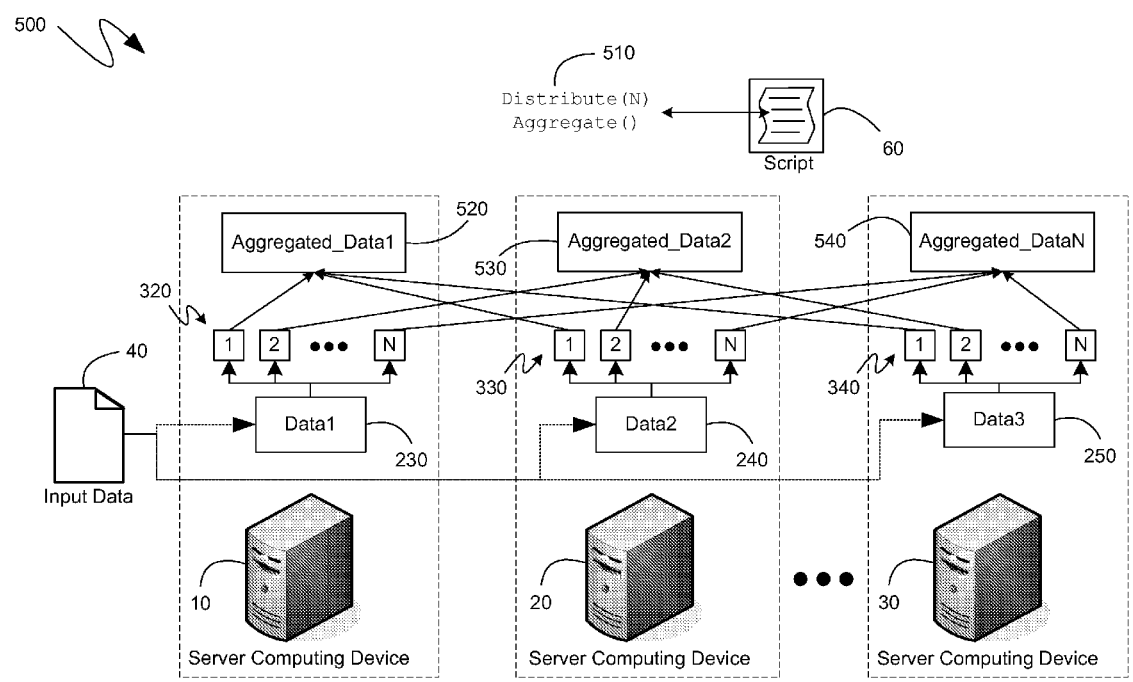
FIG. 6 is a block diagram of an "aggregate" scripting core command when performed after a "distribute" scripting core command.

Turning to FIG. 6, a functional diagram 500 is shown illustrating the operation of the distribute and aggregate scripting commands when used together. Specifically, the combination of the distribute and aggregate scripting commands 510 in script 60 can cause the data segments 230, 240 and 250, handled in parallel by the server computing devices 10, 20 and 30, respectively, to initially be divided into subdivisions 320, 330 and 340, respectively, and then subsequently aggregated into data collections 520, 530 and 540, respectively. The subdivisions 320, 330 and 340 are aggregated by aggregating the first subdivision of subdivision 320 with the first subdivision of subdivisions 330 and 340 into the first aggregated data collection 520, by aggregating the second subdivision of subdivision 320 with the second subdivision of subdivisions 330 and 340 into the second aggregated data collection 530, and, in this manner aggregate all of the subdivisions 320, 330 and 340.

As will be recognized by those skilled in the art, the combination of the distribute and aggregate scripting commands 510 illustrated in FIG. 6 is the often used mapping command, whereby a collection of data, comprising data segments 230, 240 and 250, is sorted according to some specified criteria. Therefore, in one embodiment, the combination of the distribute and aggregate scripting core commands can be abstracted by a map scripting command that performs in accordance with the functional diagram 500 of FIG. 6. The syntax of the map scripting command can be analogous to the syntax of the distribute scripting command described above. In particular, the map scripting command can enable a script author to specify an executable program or a code block that can perform the mapping, a file, variable or other identifier of the data to be mapped, and a value representing the number of sub-divisions into which the data is first to be divided. Thus, a map scripting command can be of the form "map(<<executable>>, N, <<input>>)" or, alternatively, "map(<<code block>>, <<arguments>>, N, <<input>>)" where "<<executable>>" can represent the name of the executable file, "<<code block>>" and "<<arguments>>" can represent, respectively, the name of a function defined by a distribute code block, in the manner described above, and the arguments associated with that code block, the variable "N" can represent a numerical value signifying the number of subdivisions into which the data is to be divided by each process, and "<<input>>" can, as above, be a name and location of a file comprising the data to be mapped, a variable pointing to the data, or any other analogous mechanism provided by the scripting language being used.

While the aggregate scripting command 410 can combine data from multiple data sets output by a single prior command, or stored in a file, in another embodiment, scripting core commands can be provided for the combining of data from multiple sets where each set was the output of a prior command. Thus, such scripting core commands would be able to combine the outputs of two or more prior commands.

Figure 7:
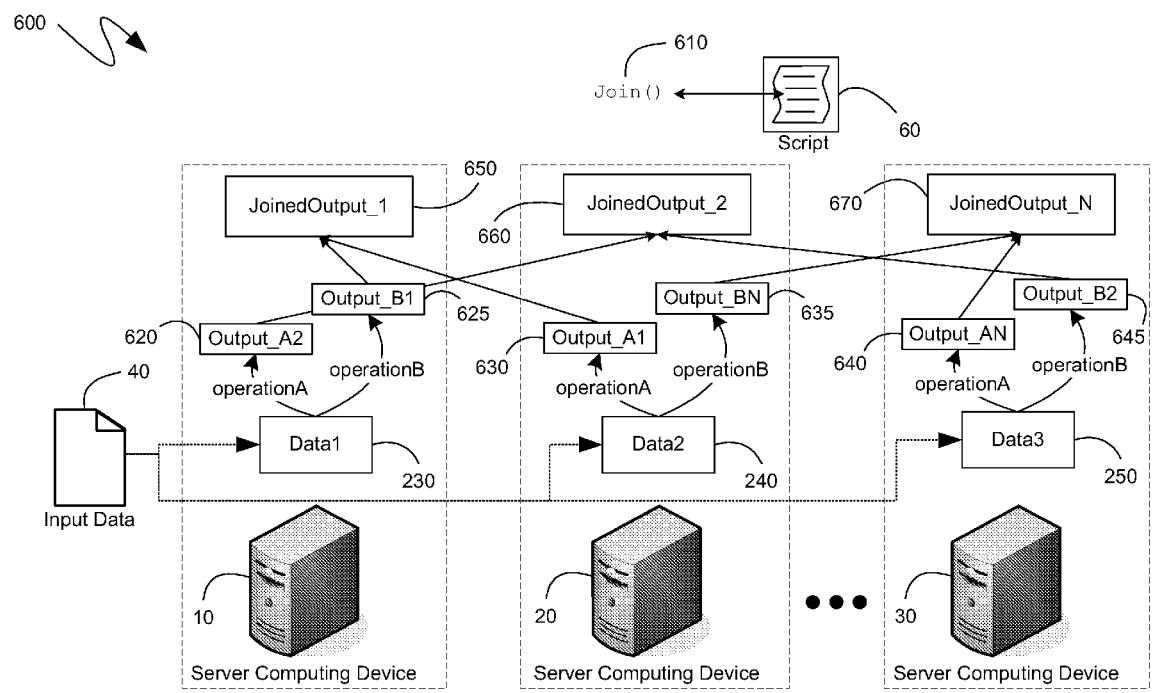
FIG. 7 is a block diagram of a "join" scripting core command.

One such scripting core command, illustrated by the functional diagram 600 of FIG. 7 can be the "join" scripting core command. By using the join scripting command 610 in the script 60, the programmer can cause the output of a first operation, previously performed and represented by output 620, 630 and 640, to be combined with the output of a second operation, also previously performed and represented by output 625, 635 and 645. More particularly, the results, termed "left" and "right", of the two prior operations are combined such that the primary "left" result is combined with the primary "right" result, the secondary "left" result is combined with the secondary "right" result, and continuing in such a manner until all the results have been combined. For example, as illustrated in FIG. 7, the primary output of the first operation 630 is combined with the primary output of the second operation 625, even though output 630 was generated by a different computing device than output 625. Similarly, the secondary output of the first operation 620 is combined with the secondary output of the second operation 645. Because of this pairing, in one embodiment, the join scripting command is applicable to two prior operations that have the same number of results.

The determination of how the "left" and "right" outputs are to be ranked, in order to be combined appropriately by the join scripting command 610, can be performed by an executable program, or it can be performed by a join code block that can be written by the script author themselves. As with the prior scripting core commands described above, the syntax of a join scripting command 610 can specify the command and then, as input, provide either an identification of a file comprising the executable program, or an identification of the join code block and, in addition, any arguments relevant to the join code block. In addition, the syntax of the join scripting command 610 can comprise the specification of the "left" and "right" inputs that are to be joined. Thus, in one embodiment, a syntax for the join scripting command 610 can be either of the form "join(<<executable>>,<<left>>,<<right>>)" or it can be of the form "join(<<code block>>, <<arguments>>, <<left>>,<<right>>)" where the syntactical elements with the same names are as described above, and the <<left>> and <<right>> elements can comprise names and locations of one or more files comprising the data to be joined, variables pointing to the data, or other appropriate data identification mechanisms.

If a join code block is used, the code can be written to accept two inputs, namely the "left" and "right" inputs, and to output the joined data. As with the other previously described code blocks, the join code block can be identified via tags signifying the higher level computer programming language in which the join code block was written. For example, Table 5, below, illustrates an exemplary join code block written in the C# programming language, where the "left" and "right" inputs are provided by instances of the StreamReader class and the output mechanism is an instance of the StreamWriter class. In addition, as above, the tag identifying the join code block comprises parameters specifying the name of the function, which, in the illustrated example of Table 5, is "SampleJoin", and the scripting core command with which it is to be used, namely the join scripting command in the present example.

TABLE 5

```
<c# block=SampleJoin command="Join">
    static void JoinDelegate(
        StreamReader left,
        StreamReader right,
        StreamWriter writer,
        string[ ] args);
    {
    }
</c#>
```

Another scripting core command that can be provided for combining the output of two prior commands can be a "cross-product" scripting core command that combines each data segment output by a first command with each data segment output by a second command. More specifically, a primary output of a first command could be combined with the primary output of a second command, the secondary output of the second command and, indeed, every output of the second command. Likewise, the secondary output of the first command could be combined with every output of the second command, with such combinations continuing for all of the outputs of the first command. Thus, the output segments produced by the cross-product scripting core command can be equal to the product of the number of outputs of the first command and the number of outputs of the second command. Because of the nature of the combination performed by the cross-product scripting core command, the number of outputs of the first and second commands do not need to be equal for the cross-product scripting command to operate properly.

Figure 8:
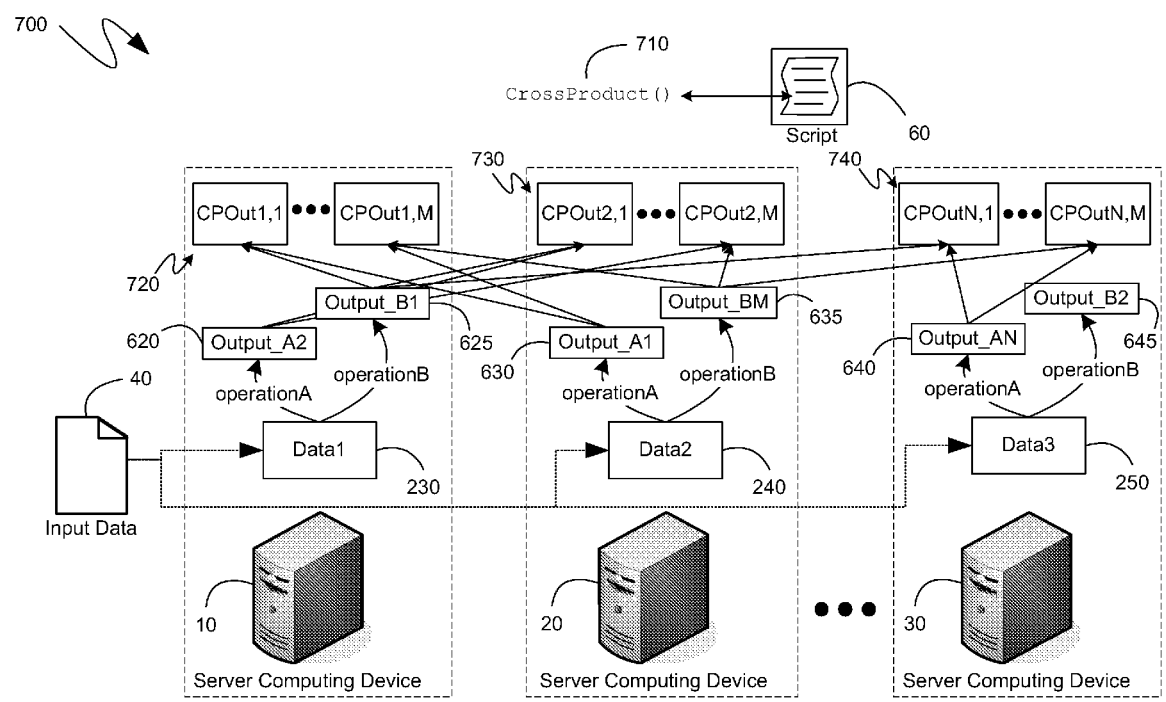
FIG. 8 is a block diagram of a "cross-product" scripting core command.

Turning to FIG. 8, functional diagram 700 illustrates an exemplary operation of the cross-product scripting command 710. Specifically, as in FIG. 7, a first operation can generate output 620, 630 and 640, while a second operation can generate output 625, 635 and 645. However, as shown in FIG. 8, the cross-product scripting command 710 can result in the combination of the first output of the first operation 630 being combined, not only with the first output of the second operation 625, as shown, but also with the second output of the second operation 645, and with all of the other outputs of the second operation, generically represented by the block 635. Similarly, the second output of the first operation 620 can be combined with the first output of the second operation 625, as shown, the second output of the second operation 645, and with all of the other outputs of the second operation 635. The cross-product scripting command 710, therefore, results in multiple outputs 720, multiple outputs 730 and multiple outputs 740 across the processors performing the cross-product command in parallel, such as the server computing devices 10, 20 and 30, respectively.

In one embodiment, the syntax of the cross-product scripting command 710 can mirror that of the join scripting command 610, described above. Specifically, the syntax of the cross-product scripting command 710 can, in one embodiment, be either of the form "crossproduct(<<executable>>, <<left>>,<<right>>)" or it can be of the form "crossproduct (<<code block>>, <<arguments>>,<<left>>,<<right>>)" where the syntactical elements with the same names are as described above, and, as also described above, the <<left>> and <<right>> elements can comprise identification of the data to be joined.

In addition to the scripting core commands described above, abstractions of the scripting core commands can also be provided to enable easier access to commonly used versions of the scripting core commands. One such abstraction can be the map scripting command, described above, which abstracts a combination of the distribute and aggregate scripting core commands. Another abstraction can be a "sort" command, which can be the process scripting core command 210 used specifically to apply a sorting function in parallel. Such a sort command can mirror the syntax of the process scripting core command 210, as described above, with the exception that the sort command need not specify an executable program or a code block. Specifically, the default function performed by the sort scripting command can be the sorting function itself, and, consequently, no specification of an executable program or code block would be required. The sort scripting command, therefore, can have a syntax as simple as "sort(<<arguments>>)", where "<<arguments>>" can represent any arguments that the default sorting function may be able to receive and that the script author may wish to specify. Alternatively, the sort scripting command can specify the data to be sorted by conforming to a syntax of the form "sort (<<arguments>>,<<input>>)" where "<<input>>" can, as described above, be a name and location of a file comprising the data to be sorted, a variable pointing to the data, or any other analogous mechanism provided by the scripting language being used.

Another abstraction of a scripting core command can be a "merge" scripting command, which can be the aggregate scripting core command 410 used specifically to aggregate sorted results of a prior operation. Thus, the form of merge command can mirror the form of the aggregate scripting core command 410 described in detail above. A further abstraction of the aggregate scripting core command 410 can be an "output" scripting command, which can aggregate the results of a prior operation into a file or other output destination. In one embodiment, the form of the output command can, like the merge scripting command, mirror that of the aggregate scripting command 410 described in detail above, with the addition of the specification of an output destination.

One advantage of a scripting language is the ability to assign the output of a particular function to a variable through a simple statement. Specifically, many scripting languages support the syntax "VariableName=Command(operands)" as a valid mechanism by which the output of the "Command", given the specified "operands" can be subsequently referenced by the VariableName. Consequently, each of the above forms of the scripting commands described can be preceded by a variable name and an equals sign, thereby causing the output of the scripting command to be associated with, and subsequently referenced by, the variable name.

Once the above scripting core commands have been used in a script, such as script 60, the script can be interpreted by an interpreter 61 to generate lower-level computer-executable instructions. In one embodiment, the interpreter 61 can reference one or more libraries that can support the above described scripting core commands in a generic manner. More specifically, the referenced libraries can generate the appropriate low-level computer executable instructions for the above described commands even if such commands were presented in an alternative programming construct. Consequently, such generic libraries can be used by the interpreter 61 as part of the interpretation of the script 60 even though they may have been originally created to support other programming constructs. Scripting support can, in such a manner, be efficiently added to pre-existing methodologies.

Figure 9:
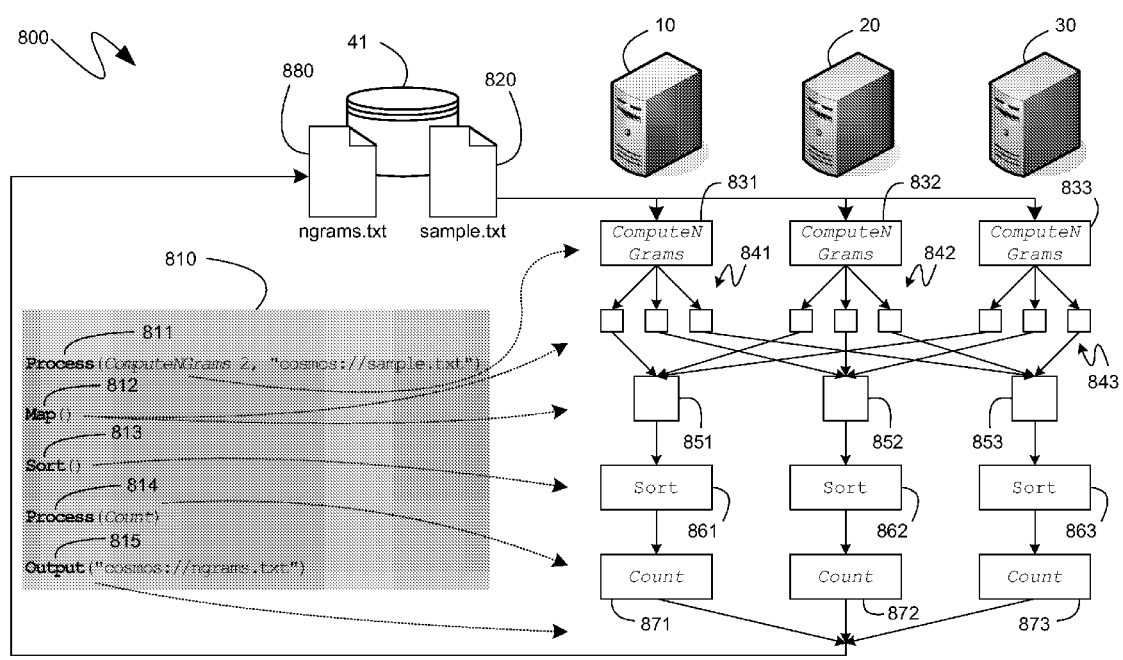
FIG. 9 is a block diagram illustrating the use of multiple scripting core command in sequence.

Turning to FIG. 9, the functional diagram 800 comprises an exemplary simple script 810 written using the above described scripting core commands and abstracts. The script 810 is written to take, as input, data from a file 820, entitled "sample.txt" in the illustrated example, perform some functions on this input data, and output the results to an output file 880, entitled "ngrams.txt" in the illustrated example. Because of the usage of the scripting core commands and aggregations described above, a simple script, such as script 810, can be distributed across multiple processes, such as across server computing devices 10, 20 and 30, as illustrated in FIG. 9.

Initially, as can be seen in the script 810, a process scripting command 811 can be used, specifying, as input, data from the sample.txt file 820, and specifying that the function "ComputeNGrams" is to be applied to the data. The function "ComputeNGrams" can be defined in a process code block, such as process code block 910 of FIG. 10. The interpreter 61 can, based on such a command, generate the appropriate instructions to cause the server computing devices 10, 20 and 30, for example, to apply the instances of the ComputeNGrams function 831, 832 and 833, respectively, to segments of the data obtained from the file 820.

The script 810 can, after the process scripting command 811, specify a map scripting command 812, which, as indicated previously, can be an aggregation of the distribute and aggregate scripting core commands. The interpreter 61 can, therefore, generate the appropriate instructions, when interpreting the map scripting command 812, to cause the server computing devices 10, 20 and 30 to first distribute the results of the instances of the ComputeNGrams function 831, 832 and 833 into subsections 841, 842 and 843, respectively, and subsequently, to aggregate those subsections into sections 851, 852 and 853. The interpreter 61, therefore, can recognize, based on the order of the commands 811 and 812, that the default input for the map scripting command 812 was the output of the process scripting command 811, and can generate the underlying computing instructions appropriately.

As described above, the scripting core commands, in one embodiment, use the most common scenario as their default values. In the case of inputs, for example, absent explicit specification from the script author, which the scripting core commands provide for, as also explained above, the default input to a command can be the output of the prior command, and can be so specified by the interpreter 61. To maintain flexibility, however, the scripting core commands do enable a script author to specify the input, as also explained above.

Subsequent to the mapping command 812, the exemplary script 810 of FIG. 9, specifies a sort command 813, which, as explained previously, can be a process scripting command that applies a sorting function. Thus, the interpreter 61 can generate the appropriate instructions to cause the server computing devices 10, 20 and 30 to apply instances of a sorting function 861, 862 and 863, respectively to the data 851, 852 and 853, respectively. Thus, again the interpreter 61 applies, as the default input to the command 813, the output of the prior command 812.

The exemplary script 810 lists another process scripting command 814, this time applying a function termed "Count," after the sorting command 813. The "Count" function can be defined by another process code block, such as code block 920 of FIG. 10. To properly handle a code block, such as code block 920, the interpreter 61 can invoke an appropriate compiler, based on the programming language identified in the tag of the code block 920, to compile the code from the code block into a more easily executable form. Such a form can then be referenced by the low-lever executable instructions being generated by the interpreter. Thus, the interpreter 61, with the aid of an appropriate compiler, can generate the instructions to cause the server computing devices 10, 20 and 30 to apply instances of the counting function 871, 872 and 873, respectively, to the output of the instances of the sorting function 861, 862 and 863, respectively. As its final step, the script 810 uses the output scripting command 815 to aggregate the output of the instances of the counting function 871, 872 and 873 into the specified ngrams.txt file 880, resulting in the interpreter 61 generating the appropriate code for causing the server computing devices 10, 20 and 30 to do so.

As can be seen from the above descriptions, scripting core commands and aggregations are provided for specific, fundamental operations to enable a programmer to easily generate programs that can benefit from parallel-processing without requiring the programmer to learn the complex mechanisms traditionally associated with parallel-processing. In view of the many possible variations of the subject matter described herein, we claim as our invention all such embodiments as may come within the scope of the following claims and equivalents thereto.

We claim:

1. One or more computer storage media comprising computer-executable instructions for providing parallel-processing-capable scripting commands, the computer-executable instructions directed to steps comprising:

interpreting a process scripting command, specifying a process input data and either a process executable file comprising one or more process functions or a process code block comprising the one or more process functions, to generate computer-executable instructions for applying, in parallel across one or more processes, the one or more process functions to the process input data to generate a process output data;

interpreting a distribute scripting command, specifying at least a distribute input data, to generate computer-executable instructions for dividing, in parallel across one or more processes, the distribute input data into two or more subdivisions representing a distribute output data;

interpreting an aggregate scripting command, specifying multiple aggregate input data, to generate computer-executable instructions for combining, in parallel across one or more processes, the multiple aggregate input data into an aggregate output data;

interpreting a join scripting command, specifying a first and second join input data, both having an equivalent number of segments, to generate computer-executable instructions for combining, in parallel across one or more processes, each segment of the first join input data with a corresponding segment of the second join input data to form a join output data; and interpreting a cross-product scripting command, specifying a first and second cross-product input data, to generate computer-executable instructions for combining, in parallel across one or more processes, each segment of the first cross-product input data with each segment of the second cross-product input data to form a cross-product output data.

2. The computer storage media of claim 1, wherein the generated computer-executable instructions for dividing the distribute input data are generated in accordance with one or more distribute functions if the distribute scripting command specifies either a distribute executable program comprising the one or more distribute functions or a distribute code block comprising the one or more distribute functions; wherein the generated computer-executable instructions for combining the multiple aggregate input data are generated in accordance with one or more aggregate functions if the aggregate scripting command specifies either an aggregate executable program comprising the one or more aggregate functions or an aggregate code block comprising the one or more aggregate functions; and wherein the generated computer-executable instructions for combining each segment of the first join input data with the corresponding segment of the second join input data are generated in accordance with one or more join functions if the join command specifies either a join executable program comprising the one or more join functions or a join code block comprising the one or more join functions.

3. The computer storage media of claim 1 comprising further computer-executable instructions directed to interpreting abstractions of the process scripting command, the distribute scripting command, the aggregate scripting command, the join command, or the cross-product command, which perform specific, commonly used operations.

4. The computer storage media of claim 1, wherein the generated computer-executable instructions for combining the multiple aggregate input data comprise computer-executable instructions for combining each subdivision of the multiple aggregate input data in one process with a corresponding subdivision of the multiple aggregate input data in at least one other process if the aggregate scripting command follows the distribute scripting command such that the two or more subdivisions output by the distribute scripting command comprise the multiple aggregate input data.

5. The computer storage media of claim 1, wherein the interpreting of at least one of the process, distribute, aggregate, join or cross-product commands comprises identifying at least one of the process input data, the distribute input data, the multiple aggregate input data, the first and second join input data, and the first and second cross-product input data as output data of a preceding command if the at least one of the process input data, the distribute input data, the multiple aggregate input data, the first and second join input data, and the first and second cross-product input data is not explicitly specified.

6. The computer storage media of claim 1, wherein the process code block comprises a language identification of a computer programming language in which the one or more process functions was written.

7. The computer storage media of claim 6 comprising further computer-executable instructions directed to invoking a compiler associated with the computer programming language identified by the language identification to compile the one or more process functions.

8. The computer storage media of claim 6 comprising further computer-executable instructions directed to wrapping the process code block with computer-executable instructions conforming to the computer programming language identified by the language identification and enabling compilation and linking of the process code block with a script comprising the process scripting command.

9. One or more computer storage media comprising computer-executable instructions for interpreting a script, the computer-executable instructions directed to steps comprising: interpreting the script with reference to a library of computer-executable commands for generating a program that can be executed across multiple processes, the library comprising: a process command for applying a process function to a process input data in parallel across one or more processes, a distribute command for dividing a distribute input data into two or more subdivisions in parallel across one or more processes, an aggregate command for combining multiple aggregate input data in parallel across one or more processes, a join command for combining a first join input data and a second join input data, both having an equivalent number of segments, such that each segment of the first join input data is combined with a corresponding segment of the second join input data in parallel across one or more processes, and a cross-product command for combining each segment of a first cross-product input data, that was specified as part of the cross-product command, with each segment of a second cross-product input data, that was also specified as part of the cross-product command, in parallel across one or more processes; and invoking a compiler to compile a process code block comprising the process function, if the script comprises a process scripting command identifying the process code block.

10. The computer storage media of claim 9, wherein the process code block comprises a language identification of a computer programming language in which the one or more process functions was written; and wherein the invoked compiler is appropriate for the computer programming language identified by the language identifier.

11. The computer storage media of claim 9 comprising further computer-executable instructions directed to wrapping the process code block with computer-executable instructions conforming to the computer programming language identified by the language identification and enabling compilation and linking of the process code block with the script, if the script comprises the process scripting command identifying the process code block.

12. The computer storage media of claim 9, wherein the interpreting the script comprises executing a process executable file if the script comprises a process scripting command identifying the process executable file.

13. A method for providing parallel-processing-capable commands, the method comprising the steps of:
    interpreting a process scripting command, specifying a process input data and either a process executable file comprising one or more process functions or a process code block comprising the one or more process functions, to generate computer-executable instructions for applying, in parallel across one or more processes, the one or more process functions to the process input data to generate a process output data;
    interpreting a distribute scripting command, specifying at least a distribute input data, to generate computer-executable instructions for dividing, in parallel across one or more processes, the distribute input data into two or more subdivisions representing a distribute output data;
    interpreting an aggregate scripting command, specifying multiple aggregate input data, to generate computer-executable instructions for combining, in parallel across one or more processes, the multiple aggregate input data into an aggregate output data;

interpreting a join scripting command, specifying a first and second join input data, both having an equivalent number of segments, to generate computer-executable instructions for combining, in parallel across one or more processes, each segment of the first join input data with a corresponding segment of the second join input data to form a join output data; and interpreting a cross-product scripting command, specifying a first and second cross-product input data, to generate computer-executable instructions for combining, in parallel across one or more processes, each segment of the first cross-product input data with each segment of the second cross-product input data to form a cross-product output data.

14. The method of claim 13, wherein the generated computer-executable instructions for dividing the distribute input data are generated in accordance with one or more distribute functions if the distribute scripting command specifies either a distribute executable program comprising the one or more distribute functions or a distribute code block comprising the one or more distribute functions; wherein the generated computer-executable instructions for combining the multiple aggregate input data are generated in accordance with one or more aggregate functions if the aggregate scripting command specifies either an aggregate executable program comprising the one or more aggregate functions or an aggregate code block comprising the one or more aggregate functions; and wherein the generated computer-executable instructions for combining each segment of the first join input data with the corresponding segment of the second join input data are generated in accordance with one or more join functions if the join command specifies either a join executable program comprising the one or more join functions or a join code block comprising the one or more join functions.

15. The method of claim 13 further comprising the steps of interpreting abstractions of the process scripting command, the distribute scripting command, the aggregate scripting command, the join command, or the cross-product command, which perform specific, commonly used operations.

16. The method of claim 13, wherein the generated computer-executable instructions for combining the multiple aggregate input data comprise computer-executable instructions for combining each subdivision of the multiple aggregate input data in one process with a corresponding subdivision of the multiple aggregate input data in at least one other process if the aggregate scripting command follows the distribute scripting command such that the two or more subdivisions output by the distribute scripting command comprise the multiple aggregate input data.

17. The method of claim 13, wherein the interpreting of at least one of the process, distribute, aggregate, join or cross-product commands comprises identifying at least one of the process input data, the distribute input data, the multiple aggregate input data, the first and second join input data, and the first and second cross-product input data as output data of a preceding command if the at least one of the process input data, the distribute input data, the multiple aggregate input data, the first and second join input data, and the first and second cross-product input data is not explicitly specified.

18. The method of claim 13, wherein the process code block comprises a language identification of a computer programming language in which the one or more process functions was written.

19. The method of claim 18 further comprising the steps of invoking a compiler associated with the computer programming language identified by the language identification to compile the one or more process functions.

20. The method of claim 18 further comprising the steps of wrapping the process code block with computer-executable instructions conforming to the computer programming language identified by the language identification and enabling compilation and linking of the process code block with a script comprising the process scripting command.

* * * * *